Patented Apr. 16, 1946

2,398,462

UNITED STATES PATENT OFFICE 2,398,462

PROCESSES FOR CATALYTIC BENZENE SYNTHESIS

Otto Roelen and Walter Feisst, Oberhausen-Holten, Germany; vested in the Alien Property Custodian No Drawing. Original application March 23, 1937, Serial No. 132,595. Divided and this application November 1, 1941, Serial No. 417,495. In Germany April 1, 1936

10 Claims. (Cl. 260—449.6)

This invention relates to processes for reacting carbon monoxide and hydrogen, and more particularly to benzene synthesis in the presence of catalysts deposited on carrier substances.

This invention is a division of U. S. Serial No. 132,595, filed March 23, 1937, which matured into Patent No. 2,261,184.

It is an object of this invention to provide improved catalytic materials, and to utilize such improved catalytic materials in processes for reacting carbon monoxide and hydrogen.

It is another object of this invention to provide processes for regenerating these catalysts after they have suffered a material reduction in activity.

Other objects, and the manner in which the same are attained, will appear from the following description.

In large scale benzene synthesis from carbon monoxide and hydrogen the catalysts employed are metals of the iron group (iron, cobalt, nickel) whose active constituents have been precipitated on to kieselguhr. Certain difficulties have been experienced in the production of such catalysts, as the kieselguhr used as carrier mass when brought into contact with acidic and alkaline reagents gives off soluble constituents which have an extremely prejudicial action on the catalytic substance.

Thus for example when kieselguhr is added to the alkaline precipitating solution for the metal catalysts, a part of the silicic acid of the kieselguhr dissolves in the form of alkali silicate, and reacts with the heavy-metal salts to form insoluble heavy-metal silicates which cannot be reduced to metal and thus prejudicially affect the activity of the catalyst.

Therefore care should be taken that none of the disturbing constituents dissolve out from the carrier mass. This can be prevented when kieselguhr or powdered asbestos is used by reducing as far as possible the period of contact with the alkaline precipitating solution, and by adding the carrier material containing silicate to the alkaline solution only when the precipitation of the catalytic metals has completely, or almost completely, ceased and the solution is no longer strongly alkaline.

With special advantage carrier materials are employed which have been rendered insoluble by dissolving out the soluble constituents. In some instances, the dissolving out of the soluble constituents may be preceded by heating these constituents to incandescence.

The catalysts precipitated on carrier materials such as kieselguhr prepared according to the method of this invention give normal yields in the conversion of mixtures of carbon monoxide and hydrogen into liquid hydrocarbons at the low reaction temperature of 180–185° C. These catalysts can be regenerated by treatment with hydrogen in the synthesis furnace itself.

The carrier materials can be produced either artificially or by a suitable treatment of minerals occurring in nature. Insoluble oxides may be produced for example by the decomposition by heat treatment of suitable salts such as the nitrates or the ammonium salts of the heavy-metal oxyacids. The oxides so produced can be rendered still less soluble by further heat treatment; for example, a suitable aluminum oxide insoluble in acid is produced by the thermal decomposition of aluminum nitrate. A suitable chromium oxide may be obtained for example by heating ammonium bichromate. In this case it is advisable to reduce the solubility of the chromic oxide by further heating the chromic oxide first obtained.

Insoluble oxides or silicates may be obtained by dissolving out from suitable substances occurring in nature or artificially produced, those constituents which are soluble in acid. By this means difficultly soluble silicates such as steatite or chamotte can be treated to produce a suitable insoluble carrier material.

In certain cases it may be an advantage first to heat to incandescence the carrier material to be employed in order to make it less soluble, and only then to dissolve out from the carrier material the constituents which are soluble in acids.

In order to obtain a very fine distribution of the carrier materials, they may be mixed with finely divided organic substances such as woodpulp, cellulose and the like, and then the organic substances can be burned out in order at the same time to obtain fine distribution and conversion to the insoluble condition.

The carrier materials thus produced are generally not completely insoluble in alkaline solutions, and the alkaline compounds produced likewise react with the metal catalysts to produce heavy-metal compounds which are insoluble and cannot be reduced to metal, and which may considerably affect the activity of the catalyst and even lead to the formation of a completely inactive material.

It is therefore advisable even when using such carrier materials for the purpose of avoiding the damage to the catalyst which was referred to above, to place the carrier masses into the conversion vessel only when the precipitation of the catalytically active metals has almost come to an end, so that the precipitating solution has no longer a strongly alkaline reaction.

In the same way as it is necessary to prevent any of the constituents of the carrier mass from dissolving during the precipitation of the catalytically active substances, care must be taken that during the regeneration of the catalysts which have become inactive, no foreign substances enter the solution which contains the catalytic metals; for the catalyst may have subsequently absorbed substances from the vessels or from the contact furnace, for example through the synthesis gas, and these substances may also become dissolved during the regeneration of the spent catalyst and on precipitation may affect the catalyst. Foreign substances may enter into solution during regeneration, as for example from the material of the vessel employed for carrying out this process (either by being mechanically removed or chemically dissolved), or from the chemicals employed during regeneration, such as the nitric acid employed for dissolving the catalysts that have become inactive. Moreover during the regeneration of the catalysts, constituents which were insoluble during the first production of the catalyst may pass into solution from the carrier mass under the possibly more severe conditions involved in the dissolving of the spent catalysts. These noxious impurities are rendered ineffective by causing them to be removed from the solution containing the catalytic substances by a suitable precipitation.

It has been found advantageous to precipitate these noxious impurities by first adding a small quantity of the alkaline precipitating agent. After the removal of the first precipitate, for example by filtration, the actual metal catalysts are then precipitated by the further addition of the alkaline precipitating solution. In this case also it is advisable to add to the precipitating mixture the substances to be employed as carrier masses after the precipitation of the metal catalysts is completely or almost completely finished.

We claim:

1. A process for the synthesis of normally liquid hydrocarbons from a mixture of carbon monoxide and hydrogen, which comprises passing said mixture at a synthesis temperature over a carrier catalyst which has ben obtained by pre-treating the carrier material with acids to remove soluble constituents and combining, while avoiding a strongly alkaline reaction, the acid-treated carrier material with iron group metal compounds precipitated from salt solutions with alkaline precipitants; and separating normally liquid hydrocarbons from the reaction products.

2. A process for the synthesis of normally liquid hydrocarbons from a mixture of carbon monoxide and hydrogen, which comprises passing said mixture at a synthesis temperature over a catalyst deposited on natural carrier substances containing silicon dioxide, said catalyst having been obtained by pretreating the carrier material with acids to remove soluble constituents, precipitating iron group metal compounds from salt solutions with alkaline precipitants and introducing the pre-treated carrier substance into the suspension of precipitate in the salt solution shortly before the precipitation is completed, so as to avoid a strongly alkaline reaction in the presence of said carrier substance; and separating normally liquid hydrocarbons from the reaction products.

3. A process for the synthesis of normally liquid hydrocarbons from a mixture of carbon monoxide and hydrogen, which comprises passing said mixture at a synthesis temperature over a catalyst deposited on natural carrier substances containing silicon dioxide, said catalyst having been obtained by pre-treating the carrier material with acids to remove soluble constituents, precipitating iron group metal compounds from salt solutions with alkaline precipitants and introducing the pre-treated carrier substance into the suspension of precipitate in the salt solution after the precipitation is completed so as to avoid a strongly alkaline reaction in the presence of said carrier substance; and separating normally liquid hydrocarbons from the reaction products.

4. A process for the synthesis of normally liquid hydrocarbons from a mixture of carbon monoxide and hydrogen, which comprises passing said mixture at a synthesis temperature over a carrier catalyst which has been obtained by pre-treating the carrier material with acids to remove soluble constituents and combining, while avoiding a strongly alkaline reaction, the acid-treated carrier material with iron group metal compounds precipitated from salt solutions with alkaline precipitants; separating normally liquid hydrocarbons from the reaction products; continuing the synthesis reaction until the activity of the catalyst is substantially reduced; treating the catalyst with acid to dissolve out the catalytically active constituents; removing from the acid solution by a preliminary precipitation with a small amount of an alkaline precipitant the constituents dissolved out of the carrier material; precipitating the catalytically active constituents with alkaline precipitants and depositing said constituents upon the carrier material; washing and drying the catalyst thus obtained; and returning said catalyst to the synthesis reaction.

5. A process for the synthesis of normally liquid hydrocarbons from a mixture of carbon monoxide and hydrogen, which comprises passing said mixture at a synthesis temperature over a carrier catalyst which has been obtained by pre-treating the carrier material with acids to remove soluble constituents, precipitating iron group metal compounds from salt solutions with alkaline precipitants, and introducing the pre-treated carrier material into the suspension of precipitate in the salt solution after the precipitation is completed so as to avoid a strongly alkaline reaction in the presence of said carrier substance; separating normally liquid hydrocarbons from the reaction products; continuing the synthesis reaction until the activity of the catalyst is substantially reduced; treating the catalyst with acid to dissolve out the catalytically active constituents; removing from the acid solution by a preliminary precipitation with a small amount of an alkaline precipitant the constituents dissolved out of the carrier material; precipitating the catalytically active constituents with alkaline precipitants and depositing said constituents upon the carrier material; washing and drying the catalyst thus obtained; and returning said catalyst to the synthesis reaction.

6. A process for the synthesis of normally liquid hydrocarbons from a mixture of carbon monoxide and hydrogen, which comprises passing said mixture at a synthesis temperature over a carrier catalyst which has been obtained by heating the carrier material to incandescence to make it less soluble, treating it thereafter with acids to remove soluble constituents and combining, while avoiding a strongly alkaline reaction, the pretreated carrier material with iron group metal compounds precipitated from salt solutions with alkaline precipitants; and separating normally liquid hydrocarbons from the reaction products.

7. A process for the synthesis of normally liquid hydrocarbons from a mixture of carbon monoxide and hydrogen, which comprises passing said mixture at a synthesis temperature over a carrier catalyst which has been obtained by pre-treating the carrier material with acids to remove soluble constituents, precipitating iron group metal compounds from salt solutions with alkaline precipitants, and introducing the pre-treated carrier material into the suspension of precipitate in the salt solution shortly before the precipitation is completed so as to avoid a strongly alkaline reaction in the presence of said carrier substance; separating normally liquid hydrocarbons from the reaction products; continuing the synthesis reaction until the activity of the catalyst is substantially reduced; treating the catalyst with acid to dissolve out the catalytically active constituents; removing from the acid solution by a preliminary precipitation with a small amount of an alkaline precipitant the constituents dissolved out of the carrier material; precipitating the catalytically active constituents with alkaline precipitants and depositing said constituents upon the carrier material; washing and drying the catalyst thus obtained; and returning said catalyst to the synthesis reaction.

8. A process according to claim 4 wherein said catalytically active constituents are deposited upon the carrier material while avoiding a strongly alkaline reaction.

9. A process according to claim 4 wherein said catalytically active constituents are deposited upon the carrier material shortly before the precipitation is completed so as to avoid a strongly alkaline reaction in the presence of said carrier material.

10. A process according to claim 4 wherein said catalytically active constituents are deposited upon the carrier material after the precipitation is completed so as to avoid a strongly alkaline reaction in the presence of said carrier material.

OTTO ROELEN.
WALTER FEISST.